United States Patent
Bacchus (10) Patent No.: US 11,845,429 B2
(45) Date of Patent: Dec. 19, 2023

(54) LOCALIZING AND UPDATING A MAP USING INTERPOLATED LANE EDGE DATA

(71) Applicant: GM Global Technology Operations LLC, Detroit, MI (US)

(72) Inventor: Brent Navin Roger Bacchus, Sterling Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 132 days.

(21) Appl. No.: 17/490,598

(22) Filed: Sep. 30, 2021

(65) Prior Publication Data

US 2023/0098314 A1    Mar. 30, 2023

(51) Int. Cl.
| | | |
|---|---|---|
| *B60W 30/12* | (2020.01) | |
| *G01C 21/00* | (2006.01) | |
| *B60W 50/06* | (2006.01) | |
| *B60W 60/00* | (2020.01) | |
| *B60W 50/00* | (2006.01) | |

(52) U.S. Cl.
CPC ............ *B60W 30/12* (2013.01); *B60W 50/06* (2013.01); *B60W 60/001* (2020.02); *G01C 21/3819* (2020.08); *G01C 21/3859* (2020.08); *B60W 2050/0052* (2013.01); *B60W 2552/53* (2020.02)

(58) Field of Classification Search
CPC .... B60W 30/12; B60W 50/06; B60W 60/001; B60W 2050/0052; B60W 2552/53; G01C 21/3819; G01C 21/3859; G01C 21/30; G06V 20/588; G06V 20/17; G06V 20/182; G08G 1/167; H04W 4/025
See application file for complete search history.

(56) References Cited

U.S. PATENT DOCUMENTS

| | | | | |
|---|---|---|---|---|
| 6,385,539 | B1* | 5/2002 | Wilson | G08G 1/0129 340/905 |
| 6,405,132 | B1* | 6/2002 | Breed | B60N 2/2863 701/45 |
| 10,845,820 | B2* | 11/2020 | Wheeler | G01C 21/30 |
| 10,928,830 | B1* | 2/2021 | Tran | G06N 3/045 |
| 11,543,263 | B1* | 1/2023 | Bosse | G01C 21/3807 |
| 11,721,205 | B2* | 8/2023 | Modica | G08G 1/0141 701/29.1 |
| 2006/0078197 | A1* | 4/2006 | Mitsumoto | G06T 7/73 382/154 |
| 2013/0253767 | A1* | 9/2013 | Lee | B60W 50/04 701/41 |
| 2016/0304120 | A1* | 10/2016 | Okada | G06V 20/588 |
| 2017/0097237 | A1* | 4/2017 | Wang | G01C 21/206 |
| 2017/0177952 | A1* | 6/2017 | Nakamura | G06T 7/13 |
| 2018/0099667 | A1* | 4/2018 | Abe | G08G 1/167 |
| 2018/0197021 | A1* | 7/2018 | Lee | G06V 20/588 |
| 2018/0249290 | A1* | 8/2018 | Ivanov | G06T 17/05 |

(Continued)

*Primary Examiner* — Steven B Theriault
(74) *Attorney, Agent, or Firm* — Vivacqua Crane PLLC (57) ABSTRACT

A system that determines a nominal path based on interpolated lane edge data can include a processor and a memory. The memory includes instructions such that the processor is configured to receive a sensor data representing a perceived lane edge; receive map data including a lane edge; interpolate the sensor data and interpolate the map data; fuse the interpolated sensor data and the interpolated map data; and generate predicted lane edge lane edge centers based on the fused interpolated sensor data.

15 Claims, 3 Drawing Sheets

(56) References Cited

U.S. PATENT DOCUMENTS

| | | | |
|---|---|---|---|
| 2018/0286051 A1* | 10/2018 | Suzuki | G06T 7/60 |
| 2019/0145784 A1* | 5/2019 | Ma | G05D 1/0246 |
| | | | 701/448 |
| 2020/0096359 A1* | 3/2020 | Sakr | G01C 21/3446 |
| 2020/0132498 A1* | 4/2020 | Matsumaru | G08G 1/096844 |
| 2020/0149896 A1* | 5/2020 | Bush | G06V 20/588 |
| 2020/0257297 A1* | 8/2020 | Jammoussi | G05D 1/0246 |
| 2020/0279391 A1* | 9/2020 | Gross | G06T 7/73 |
| 2020/0285233 A1* | 9/2020 | Hafner | B60W 60/0055 |
| 2020/0293797 A1* | 9/2020 | Liu | G06V 10/764 |
| 2020/0309541 A1* | 10/2020 | Lavy | G06V 20/588 |
| 2020/0312146 A1* | 10/2020 | Tanaka | G08G 1/096861 |
| 2020/0318976 A1* | 10/2020 | Bush | G01C 21/32 |
| 2020/0409372 A1* | 12/2020 | Yu | B60W 40/04 |
| 2021/0003403 A1* | 1/2021 | Wheeler | G06V 20/56 |
| 2021/0063200 A1* | 3/2021 | Kroepfl | G01C 21/387 |
| 2021/0080955 A1* | 3/2021 | Wilkinson | B60W 60/0011 |
| 2021/0148711 A1* | 5/2021 | Sun | B60W 40/06 |
| 2021/0149415 A1* | 5/2021 | Bush | G01C 21/30 |
| 2021/0397854 A1* | 12/2021 | Brizzi | G06V 20/56 |
| 2022/0169280 A1* | 6/2022 | Brown | G06F 18/251 |
| 2022/0252422 A1* | 8/2022 | Zhang | G01C 21/3819 |
| 2022/0284619 A1* | 9/2022 | Brizzi | G06T 7/70 |
| 2022/0315047 A1* | 10/2022 | Probst | B60W 30/16 |
| 2023/0050706 A1* | 2/2023 | LeVasseur | G01C 21/3658 |
| 2023/0076599 A1* | 3/2023 | Hung | G06F 9/30043 |
| 2023/0137541 A1* | 5/2023 | Nguyen | G06N 3/044 |
| | | | 706/23 |
| 2023/0144209 A1* | 5/2023 | Cai | G06V 20/588 |
| | | | 348/148 |
| 2023/0152120 A1* | 5/2023 | Ikeda | G01C 21/3815 |
| | | | 701/450 |
| 2023/0215196 A1* | 7/2023 | Sakashita | G06V 10/82 |
| | | | 382/104 |

* cited by examiner

LOCALIZING AND UPDATING A MAP USING INTERPOLATED LANE EDGE DATA

INTRODUCTION

The technical field generally relates to perception systems and methods, and more particularly relates to systems and methods for associating perceived objects with corresponding map data.

Autonomous and semi-autonomous vehicles typically require accurate perception of objects to object tracks. The perception of object tracks can be subject to perspective distortions. This results in incorrect lane identification of objects. In addition, the sensor data from the vehicle sensors and/or received map data may contain significant noise thus, further reducing the accuracy for identifying lane edges. Such discrepancies can be problematic because autonomous vehicles, in particular, require proper identification of lane edges on the roadways.

SUMMARY

A system including a controller including a processor and a memory is disclosed. The memory includes instructions such that the processor is configured to: receive a sensor data representing a perceived lane edge, receive map data including a lane edge, interpolate the sensor data and interpolate the map data, fuse the interpolated sensor data and the interpolated map data, and generate predicted lane edge centers based on the fused interpolated sensor data.

In other features, the perceived lane edge represents a lane edge disposed on a roadway.

In other features, the lane edge included in the map data corresponds to the perceived lane edge.

In other features, the controller is further configured to generate the predicted lane edge centers using a Kalman filter.

In other features, the controller is further configured to transmit the predicted lane edge centers to an autonomous controller.

In other features, the autonomous controller is configured to operate a vehicle based on the predicted lane edge centers.

In other features, the controller is further configured to a calculated average perception innovation squared metric to a predetermined average perception innovation squared metric threshold, wherein the calculated average perception innovation squared metric is based on the predicted lane edge centers.

In other features, the autonomous controller is configured to operate the vehicle based on only the sensor data representing the perceived lane edge.

A vehicle including a system is disclosed. The system includes a controller including a processor and a memory. The memory includes instructions such that the processor is configured to: receive a sensor data representing a perceived lane edge, receive map data including a lane edge, interpolate the sensor data and interpolate the map data, fuse the interpolated sensor data and the interpolated map data, and generate predicted lane edge centers based on the fused interpolated sensor data In other features, the perceived lane edge represents a lane edge disposed on a roadway.

In other features, the lane edge included in the map data corresponds to the perceived lane edge.

In other features, the controller is further configured to generate the predicted lane edge centers using a Kalman filter.

In other features, the controller is further configured to transmit the predicted lane edge centers to an autonomous controller.

In other features, the autonomous controller is configured to operate a vehicle based on the predicted lane edge centers.

In other features, the controller is further configured to a calculated average perception innovation squared metric to a predetermined average perception innovation squared metric threshold, wherein the calculated average perception innovation squared metric is based on the predicted lane edge centers.

In other features, the autonomous controller is configured to operate the vehicle based on only the sensor data representing the perceived lane edge.

A method is disclosed. The method includes receiving, via a controller, a sensor data representing a perceived lane edge, receiving map data including a lane edge, interpolating the sensor data and interpolating the map data, fusing the interpolated sensor data and the interpolated map data, and generating predicted lane edge centers based on the fused interpolated sensor data.

In other features, the perceived lane edge represents a lane edge disposed on a roadway.

In other features, the lane edge included in the map data corresponds to the perceived lane edge.

In other features, the method further comprises generating the predicted lane edge centers using a Kalman filter.

BRIEF DESCRIPTION OF THE DRAWINGS

The exemplary implementations will hereinafter be described in conjunction with the following drawing figures, wherein like numerals denote like elements, and wherein.

DETAILED DESCRIPTION

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

Autonomous and semi-autonomous vehicles are capable of sensing their environment and navigating based on the sensed environment. Such vehicles sense their environment using multiple types of sensing devices such as radar, lidar, image sensors, and the like. In such vehicles the sensed data can be fused together with map data to identify and track objects in the vicinity of the vehicles.

As discussed in greater detail herein, a system can associate perceived objects, such as lane edges, with corresponding objects within map data. For example, temporary perception or map glitches may cause future perceived object data and/or map data to be mismatched. The presently disclosed system interpolates perceived object data and interpolates map data. Once interpolated, the system fuses the interpolated data and can use the fused data to generate predicted lane edges. The system can use predicted lane edges to operate the vehicle in some implementations. For example, the system predicts a center of the lane edges, which is used as a trajectory line that a vehicle uses for traversing a roadway.

Figure 1:
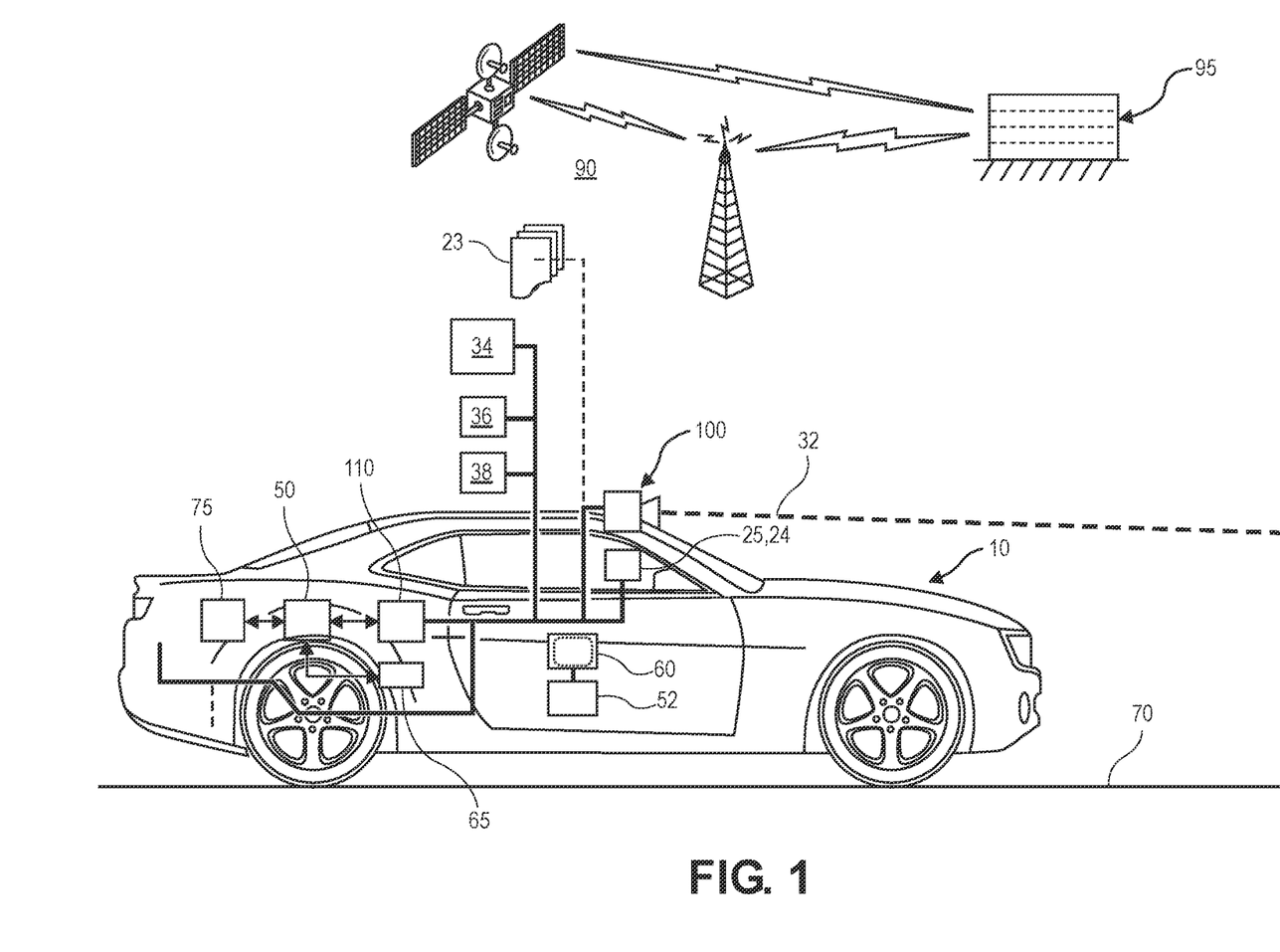
FIG. 1 depicts an example environment having a vehicle including a system that associates perceived and mapped lane edges.

FIG. 1 illustrates a side-view of a vehicle 10 disposed on and able to traverse a travel surface 70, such as a paved road surface. The vehicle 10 includes an on-board navigation system 24, a computer-readable storage device or media (memory) 23 that includes a digitized roadway map 25, a spatial monitoring system 100, a vehicle controller 50, a global positioning system (GPS) sensor 52, a human/machine interface (HMI) device 60, and in one embodiment an autonomous controller 65 and a telematics controller 75. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

In one embodiment, the spatial monitoring system 100 includes one or a plurality of spatial sensors and systems that are arranged to monitor a viewable region 32 that is forward of the vehicle 10, and a controller 110. The spatial sensors that are arranged to monitor the viewable region 32 forward of the vehicle 10 include, e.g., a lidar sensor 34, a radar sensor 36, a digital camera 38, etc. Each of the spatial sensors is disposed on-vehicle to monitor all or a portion of the viewable region 32 to detect proximate remote objects such as road features, lane markings, buildings, pedestrians, road signs, traffic control lights and signs, other vehicles, and geographic features that are proximal to the vehicle 10. The controller 110 generates digital representations of the viewable region 32 based upon data inputs from the spatial sensors.

The controller 110 can evaluate inputs from the spatial sensors to determine a linear range, relative speed, and trajectory of the vehicle 10 in view of each proximate remote object. The spatial sensors can be located at various locations on the vehicle 10, including the front corners, rear corners, rear sides and mid-sides. The spatial sensors can include a front radar sensor and a camera in one embodiment, although the disclosure is not so limited. Placement of the spatial sensors permits the controller 110 to monitor traffic flow including proximate vehicles, intersections, lane markings, and other objects around the vehicle 10. Data generated by the controller 110 may be employed by a lane marking detection processor (not shown) to estimate the roadway.

The spatial sensors of the vehicle spatial monitoring system 100 may include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward objects including one or more vehicle(s).

The lidar sensor 34 employs a pulsed and reflected laser beam to measure range or distance to an object. The radar sensor 36 employs radio waves to determine range, angle, and/or velocity of an object. The camera 38 includes an image sensor, lens, and a camera controller. The image sensor is an electro-optical device that converts an optical image into an electronic signal employing a multi-dimensional array of light-sensitive sensing elements. The camera controller is operatively connected to the image sensor to monitor the viewable region 32. The camera controller is arranged to control the image sensor to capture an image of a field of view (FOV) that is associated with the viewable region 32 that is projected onto the image sensor via the lens.

The optical lens may be configured to include features such as a pin-hole lens, a fisheye lens, a stereo lens, a telescopic lens, etc. The camera 38 periodically captures, via the image sensor, an image file associated with the viewable region 32 at a desired rate, e.g., 30 image files per second. Each image file is composed as a 2D or 3D pixelated digital representation of all or a portion of the viewable region 32 that is captured at an original resolution of the camera 38. In one embodiment, the image file is in the form of a 24-bit image including RGB (red-green-blue) visible light spectrum values and depth values that represent the viewable region 32. Other embodiments of the image file can include either a 2D or 3D image at some level of resolution depicting a black-and-white or a grayscale visible light spectrum representation of the viewable region 32, an infrared spectrum representation of the viewable region 32, or other image representations without limitation.

The image representations of the plurality of image files can be evaluated for parameters related to brightness and/or luminance in one embodiment. The image representations may be evaluated based upon RGB color components, brightness, texture, contour, or combinations thereof. The image sensor communicates with an encoder, which executes digital signal processing (DSP) on each image file. The image sensor of the camera 38 may be configured to capture the image at a nominally standard-definition resolution, e.g., 640×480 pixels. The image sensor of the camera 38 may be configured to capture the image at a nominally high-definition resolution, e.g., 1440×1024 pixels, or at another suitable resolution. The image sensor of the camera 38 may capture still images or digital video images at a predetermined rate of image capture. The image files are communicated to the camera controller as encoded datafiles that are stored in a non-transitory digital data storage medium in one embodiment for on-board or off-board analysis.

The camera 38 can be positioned on the vehicle 10 in a location that permits capturing images of the viewable region 32, wherein at least a portion of the viewable region 32 includes a portion of the travel surface 70 that is forward of the vehicle 10 and includes a trajectory of the vehicle 10. The viewable region 32 may also include a surrounding environment, including, e.g., vehicle traffic, roadside objects, pedestrians, and other features, the sky, a horizon, the lane of travel and on-coming traffic forward of the vehicle 10. Other cameras (not shown) may also be employed, including, e.g., a second camera that is disposed on a rear portion or a side portion of the vehicle 10 to monitor rearward of the vehicle 10 and one of the right or left sides of the vehicle 10.

The autonomous controller 65 is configured to implement autonomous driving or advanced driver assistance system (ADAS) vehicle functionalities. Such functionality may include an on-vehicle control system that is capable of providing a level of driving automation. The terms 'driver' and 'operator' describe the person responsible for directing operation of the vehicle 10, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle 10. Driving automation can include some level of automatic control or intervention related to simultaneous control of multiple vehicle functions, such as steering, acceleration, and/or braking, with the driver continuously having overall control of the vehicle 10. Driving automation can include simultaneous automatic control of vehicle driving functions that include steering, acceleration, and braking, wherein the driver cedes control of the vehicle for a period of time during a trip.

Driving automation can include simultaneous automatic control of vehicle driving functions, including steering, acceleration, and braking, wherein the driver cedes control of the vehicle 10 for an entire trip. Driving automation includes hardware and controllers configured to monitor the spatial environment under various driving modes to perform various driving tasks during dynamic vehicle operation. Driving automation can include, by way of non-limiting examples, cruise control, adaptive cruise control, lane-change warning, intervention and control, automatic parking, acceleration, braking, and the like.

The autonomous vehicle functions include, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. As such, the braking command can be generated by the autonomous controller 65 independently from an action by the vehicle operator and in response to an autonomous control function.

Operator controls may be included in the passenger compartment of the vehicle 10 and may include, by way of non-limiting examples, a steering wheel, an accelerator pedal, the brake pedal and an operator input device that is an element of the HMI device 60. The operator controls enable a vehicle operator to interact with and direct operation of the vehicle 10 in functioning to provide passenger transportation. The operator control devices including the steering wheel, accelerator pedal, brake pedal, transmission range selector and the like may be omitted in some embodiments of the vehicle 10.

The HMI device 60 provides for human/machine interaction, for purposes of directing operation of an infotainment system, the global positioning system (GPS) sensor 52, the navigation system 24 and the like, and includes a controller. The HMI device 60 monitors operator requests and provides information to the operator including status of vehicle systems, service and maintenance information. The HMI device 60 communicates with and/or controls operation of a plurality of operator interface devices, wherein the operator interface devices are capable of transmitting a message associated with operation of one of the autonomic vehicle control systems.

The HMI device 60 may also communicate with one or more devices that monitor biometric data associated with the vehicle operator, including, e.g., eye gaze location, posture, and head position tracking, among others. The HMI device 60 is depicted as a unitary device for ease of description, but may be configured as a plurality of controllers and associated sensing devices in an embodiment of the system described herein. Operator interface devices can include devices that are capable of transmitting a message urging operator action, and can include an electronic visual display module, e.g., a liquid crystal display (LCD) device, a heads-up display (HUD), an audio feedback device, a wearable device and a haptic seat.

The operator interface devices that are capable of urging operator action are preferably controlled by or through the HMI device 60. The HUD may project information that is reflected onto an interior side of a windshield of the vehicle, in the field-of-view of the operator, including transmitting a confidence level associated with operating one of the autonomic vehicle control systems. The HUD may also provide augmented reality information, such as lane location, vehicle path, directional and/or navigational information, and the like.

The on-board navigation system 24 employs the digitized roadway map 25 for purposes of providing navigational support and information to a vehicle operator. The autonomous controller 65 employs the digitized roadway map 25 for purposes of controlling autonomous vehicle operation or ADAS vehicle functions.

The vehicle 10 may include a telematics controller 75, which includes a wireless telematics communication system capable of extra-vehicle communications, including communicating with a communication network 90 having wireless and wired communication capabilities.

The telematics controller 75 is capable of extra-vehicle communications that includes short-range vehicle-to-vehicle (V2V) communication and/or vehicle-to-everything (V2x) communication, which may include communication with an infrastructure monitor, e.g., a traffic camera. The telematics controller 75 has a wireless telematics communication system capable of short-range wireless communication to a handheld device, e.g., a cell phone, a satellite phone or another telephonic device. In one embodiment the handheld device includes a software application that includes a wireless protocol to communicate with the telematics controller 75, and the handheld device executes the extra-vehicle communication, including communicating with an off-board server 95 via the communication network 90. The telematics controller 75 executes the extra-vehicle communication directly by communicating with the off-board server 95 via the communication network 90.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.), which are indicated by memory 23. The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation.

Routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like.

The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
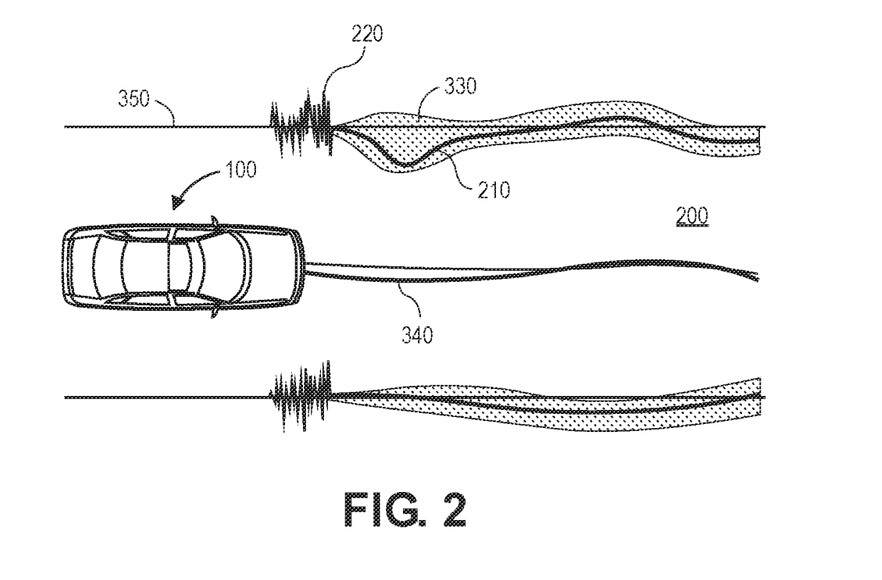
FIG. 2 depicts a diagrammatic plan view of a vehicle traversing a roadway.

FIG. 2 illustrates an example top view of a road segment 200 being traversed by the vehicle 10. The road segment 200 includes one or more lane markings 202. It is understood that the road segment 200 and the concept associated therewith may be applied to road segments that are configured as multi-lane roads.

As the vehicle 10 traverses the roadway segment 200, one or more of the spatial sensors, e.g., the lidar sensor 34, the radar sensor 36, and/or the digital camera 38, of the vehicle spatial monitoring system 100 receive input representing perceived lane markings 202. For example, a first set of points 210 are shown and represent geophysical locations of a plurality of lane markings 202 that are disposed at an edge portion of the road segment 200. The first set of points 210 form a perceived lane edge defining the edge portion 205. A second set of points 220 represent map-based locations of the lane markings 202 identified on the digitized roadway map 25 and correspond to individual ones of the lane markings 202.

In some instances, the digitized roadway map 25 and/or perceived lane markings 202 may include errors. The errors may be due to image stitching, shadows, occlusions, data staleness, e.g., lane repainting, etc., or the like. Errors may result in relative errors and/or absolute errors. Relative errors can be defined as an error in distance between two objects within a defined region. Absolute errors can be defined as errors within geographical coordinates of a detected object relative to a fixed reference.

As described in further detail herein, the controller 110 can localize the vehicle 10 to the digitized roadway map 25 using the first set of points 210. In some implementations, the controller 110 localizes the vehicle 10 for each map frame provided by the digitized roadway map 25. The map frames can correspond to GPS coordinates of the vehicle 10. The first set of points 210 and the second set of points 220 can be represented as a sequence of points having an uncertainty. The controller 110, using the techniques described herein, uses a suitable sensor fusion process. The perceived lane edges 202 and the digitized roadway map 25 correspond to a Cartesian coordinate system (comprising an X-axis, a Y-axis, and a Z-axis). For example, each point from the first set of points 210 and the second set of points 220 can each have a corresponding x-component (x), y-component (y), and z-component (z). However, due to one or more errors, the x-component for a point from the first set of points 210 may not correspond to the x-component for same point from the second set of points 220. As a result, the map points 220 and the perceived points may not overlap.

As described in greater detail herein, the controller 110 predicts lane edges using a fused set of data points 330 based on the first set of points 210 and the second set of points 220. The controller 110 can further determine a nominal path 340 for the vehicle 10 to traverse based on the predicted edges. FIG. 2 also illustrates ground truth lane edges 350 with respect to example perceived lane edges 202 and lane edges depicted within the digitized roadway map 25.

The controller 110 can use a state vector defined in Equation 1 to localize the vehicle 10:

$$x^T = y_{lane,L} y_{Lane,R} p_e \phi b)$$

in which Table 1 defines the state variables of Equation 1:

TABLE 1

| Variable | Description | Coordinate frame | Covariance |
|---|---|---|---|
| $y_{lane,L}$ | y coordinate of left lane edge | local | $\Sigma_{y,L}$ |
| $y_{lane,R}$ | y coordinate of right lane edge | local | $\Sigma_{y,R}$ |
| $p_e$ | ego position on map | local | $\Sigma_{p_e}$ |
| $\phi$ | ego orientation | local | $\sigma_\phi^2$ |
| b | bias | local | $\Sigma_b$ |

Variables $y_{lane,L}$ and $y_{lane,R}$ represent y coordinate values for the left lane edge and the right lane edge, respectively, and represent Gaussian process priors.

The controller 110 can also receive vehicle control data from the vehicle sensors 40, which are defined in Table 2:

TABLE 2

| Variable | Description | Coordinate frame | Covariance |
|---|---|---|---|
| w | yaw rate | ego | $\sigma_w^2$ |
| $v_x$ | longitudinal speed | ego | $\sigma_{v_x}^2$ |
| $v_y$ | lateral speed | ego | $\sigma_{v_x}^2$ |

The controller 110 can implement a temporal process model that is given by Equations 2 through 6:

$$y_{lane,L}|_t = y_{lane,L}|_{t-1}$$

$$y_{lane,R}|_t = y_{lane,R}|_{t-1}$$

$$\phi|_t = \phi|_{t-1} + \omega|_{t-1} \Delta T$$

$$p|_t = p|_{t-1} + \Delta p|_{t-1}$$

$$b|_t = \beta b|_{t-1}$$

$$\beta = e^{-\left|\frac{\Delta p}{\lambda_b}\right|^2} \lambda_b$$

The controller 110 can also implement a spatial process model that can propagate the lane edges over space in which time remains constant. Prior and current spatial steps can be denoted as s−1 and s (corresponding to x-values $x_{lane,i,s-1}$ and $X_{lane,i,s}$ for $i \in \{L, R\}$. The controller 110 can generate the spatial process model according to Equations 7 through 11:

$$y_{lane,L}|_s = G_{x_{lane,L,s-1}}(x_{lane,L,s})(y_{lane,L}|_{s-1}-\mu_{0,L})+\mu_{0,L}$$

$$y_{lane,R}|_s = G_{x_{lane,R,s-1}}(x_{lane,R,s})(y_{lane,R}|_{s-1}-\mu_{0,R})+\mu_{0,R}$$

$$\phi|_s = \phi|_{s-1}$$

$$p|_s = p|_{s-1}$$

$$b|_s = b|_{s-1}$$

where $\mu_{0,i}$ represents a constant prior for $y_{lane,i}$. Since the controller 110 generates the spatial process model within the local frame of the vehicle 10, the left and right lanes are expected to be approximately located at $\mu_{0,i} \pm W/2$, where W is a nominal lane width.

An observation vector that corresponds to an observation model generated by the controller 110 can be defined according to Equation 12:

$$z^T = (\tilde{y}_{per,L} \tilde{y}_{per,R} \tilde{y}_{map,L} \tilde{y}_{map,R} \tilde{\phi} \tilde{p})$$

Table 3 defines the observation variables used in generating the observation model. It is understood that some of the variables correspond to a global frame relative to the vehicle 10 and are to be converted to a local frame of the vehicle 10.

TABLE 3

| Variable | Description | Source | Coordinate frame | Covariance |
|---|---|---|---|---|
| $\hat{y}_{per,L}$ | y coordinate of left lane edge | perception | ego | $\Sigma_{y,perL}$ |
| $\hat{y}_{per,R}$ | y coordinate of right lane edge | perception | ego | $\Sigma_{y,perR}$ |
| $\hat{y}_{map,L}$ | y coordinate of left lane edge | map | local | $\Sigma_{y,map,L}$ |
| $\hat{y}_{map,R}$ | y coordinate of right lane edge | map | local | $\Sigma_{y,map,R}$ |
| $\hat{\phi}$ | heading | GPS | local | $\sigma_\phi^2$ |
| $\hat{p}$ | position | GPS | local | $\Sigma_p$ |

$$\tilde{x}_{map,i} \tilde{y}_{per,i} \tilde{y}_{map,i} \tilde{x}_{per,i}$$

The controller 110 can generate an observation model according to Equations 7 through 12:

$$\tilde{y}_{per,L} = G_{x_L}(x_{per,L})(y_L - \mu_{0,L}) + \mu_{0,L}$$

$$\tilde{y}_{per,R} = G_{x_R}(x_{per,R})(y_R - \mu_{0,R}) + \mu_{0,R}$$

$$\tilde{y}_{map,L} = y_{lane,L}|_t$$

$$\tilde{y}_{map,R} = y_{lane,R}|_t$$

$$\tilde{\phi} = \phi|_t$$

$$\tilde{p} = p_c|_t - b|_t$$

where $\mu_{0,i}$ is the previously defined prior and $$\begin{pmatrix} x_i^T \\ y_i^T \end{pmatrix} = R_{-\phi|_t}\left(\begin{pmatrix} x_{lane,i}^T \\ y_{lane,i}^T|_t \end{pmatrix} - 1^T \otimes p_c|_t\right)$$

for $i \in \{L, R\}$ and $x_{lane,i}^T$ represents the x coordinates of the left/right map lane edge states and "⊗" is the Kronecker product. The controller 110 can use Equation 13 to convert the lane edge coordinate states from global frame coordinates to ego frame coordinates, and the ego frame coordinates are then interpolated to match the x coordinates of the perceived edges by multiplying by $G_{xlane,t}(x_i)$. With respect to Equations 7 through 13 above, the lane edge states are converted from global frame coordinates to ego frame coordinates according to Equations 7, 8, and 13. Equations 9 and 10 can comprise representations of the direct observations of lane edge states from the digitized roadway map 25 data. Equations 11 and 12 represent an unbiased estimate of a map pose according to GPS data obtained from the GPS sensor 52.

Figure 3:
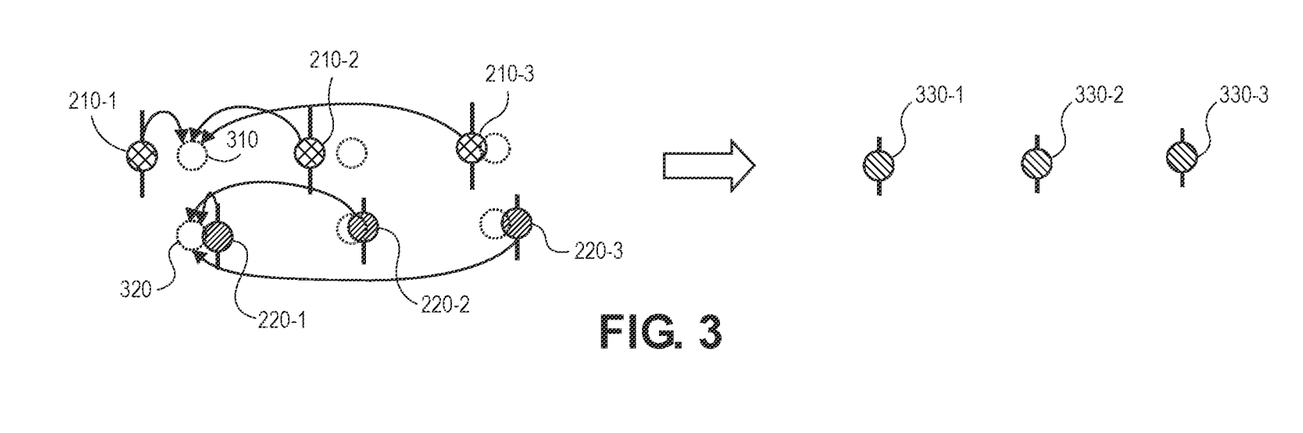
FIG. 3 depicts interpolating sensor data representing a lane edge, interpolating map data representing the lane edge, and fusing the interpolated sensor data and interpolated map data.

With respect to FIG. 3, the controller 110 interpolates the first set of data points 210 (shown as data points 210-1, 210-2, 210-3) corresponding to the digitized roadway map 25 into an interpolated first set of data points 310. The controller 110 can also interpolate the second set of data points 220 (shown as data points 220-1, 220-2, 220-3) corresponding to the perceived lane edges 202 into an interpolated second set of data points 320. The controller 110 can interpolate the sets of data points 210, 220 according to Equations 14 and 15:

$$x_v = G_u(x_v)\mu_u$$

$$\Sigma_v = P_u(x_v) + G_u(x_v)\Sigma_u G_u(x_v)^T$$

$$\Sigma_u \mu_u G_u(x_v) = K_{vu} K_{uu}^{-1}$$

$$P_u(x_v) = K_{uv} - G_u(x_v) K_{uv}$$

The controller 110 uses a Kalman filter is used to predict lane edges using the fused set of data points 330. For example, the controller 110 predicts a center of the lane edges. In some instances, the controller 110 calculates predicted lane edge centers using an extended Kalman filter (EKF). In an implementation, the controller 110 can derive a nominal path 340 for the vehicle 10 using the predicted lane edge centers and/or the fused set of data points 330 and cause the autonomous controller 65 to operate the vehicle 10 based on the nominal path 340. For example, the controller 110 determines the nominal path position, heading, and curvature by applying a suitable weighted spline fit to the fused set of data points 330.

Figure 4:
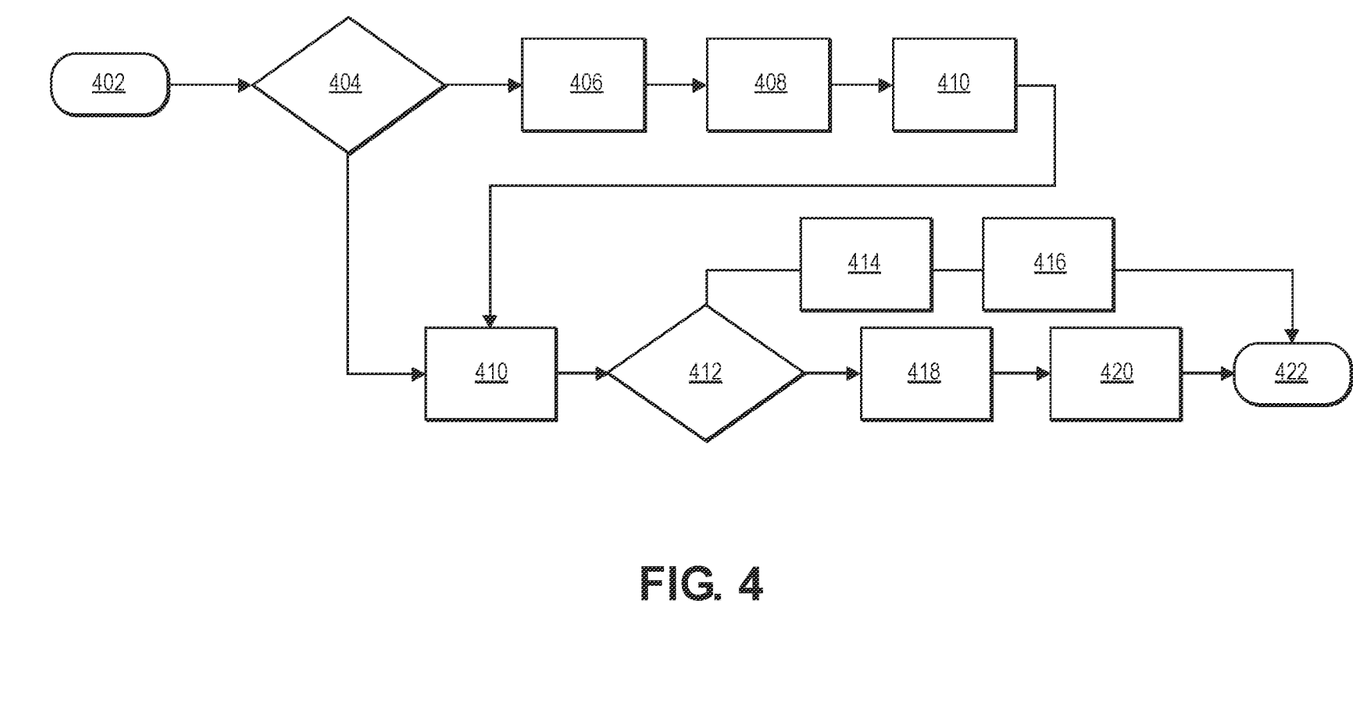
FIG. 4 is a flow diagram illustrating a process for associating perceived and mapped lane edges.

FIG. 4 illustrates an example process 400 for that determines a nominal path 340 for the vehicle 10 based on interpolated lane edge data. The process 400 can comprise software instructions executable by the controller 110.

The process 400 begins at block 402. At block 402, the controller 110 determines whether the vehicle 10 has traveled a distance that is greater than or equal to a distance threshold. If the vehicle 10 has traveled a distance greater than or equal to the distance threshold, a map frame corresponding to GPS coordinates of the vehicle 10 is updated at block 404. At block 406, the first set of data points 210 representing lane edges within the map frame are converted from global frame coordinates to ego frame coordinates.

At block 408, the controller 110 generates predicted lane edges using the fused set of data points 330. The controller 110 calculates the predicted lane edges using a suitable Kalman filter. As discussed above, the first set of data points 210 and the second set of data points 220 are interpolated and fused to generate the fused set of data points 330. At block 410, the controller 110 obtains the predicted lane edges. The predicted lane edges can be cached if the vehicle 10 has not traveled a distance greater than or equal to the distance threshold or obtained from block 408 if the map frame has been updated.

At block 412, a determination is made whether an average perception innovation squared metric is greater than or equal to an average perception innovation squared metric threshold. The average perception innovation squared metric can represent a calculated difference between the predicted lane edges and the perceived lane edges, e.g., the second set of data points 220. The average perception innovation squared metric can be defined according to Equations 16 and 17:

$$r_t = ar_{t-1} + (1-\alpha)e_t \quad \text{Equation 16,}$$

$$e_t = y_t^T S^{-1} y_t - n_t \quad \text{Equation 17,}$$

where $r_t$ is the average perception innovation squared metric, $y_t$ is a perception innovation vector, $n_t$ is a size of the innovation vector, S is a perception innovation covariance matrix, and a is a filter weight, e.g., between 0 and 1. The controller 110 compares the calculated average perception innovation squared metric $r_t$ to the predetermined average perception innovation squared metric threshold. The process 400 moves to block 414 when $r_t$ is greater than or equal to the average perception innovation squared metric threshold indicating that a change between the perceived lane edges and the predicted lane edges has been detected. At block 416, the controller 110 initiates an escalation protocol. The escalation protocol can include sending a signal to control the autonomous controller 65 and/or cause the autonomous controller 65 to only use perception data obtained from the spatial monitoring system 100 for purposes of controlling the vehicle 10.

If the $r_t$ is less than the average perception innovation squared metric threshold, the controller 110 updates the Kalman filter with the fused set of data points 330 at block 418. For example, the fused set of data points 330 may be used a prior data for future calculations. At block 420, the fused set of data points 330 is converted to global frame coordinates using ego frame coordinates. The process 400 ends at block 422.

While at least one exemplary implementation has been presented in the foregoing detailed description, it should be appreciated that a vast number of variations exist. It should also be appreciated that the exemplary implementation or exemplary implementations are only examples, and are not intended to limit the scope, applicability, or configuration of the disclosure in any way. Rather, the foregoing detailed description will provide those skilled in the art with a convenient road map for implementing the exemplary implementation or exemplary implementations. It should be understood that various changes can be made in the function and arrangement of elements without departing from the scope of the disclosure as set forth in the appended claims and the legal equivalents thereof.

The detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Implementations of the present disclosure may be described herein in terms of functional and/or logical block components and various processing steps. It should be appreciated that such block components may be realized by any number of hardware, software, and/or firmware components configured to perform the specified functions. For example, an implementation of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that implementations of the present disclosure may be practiced in conjunction with any number of systems, and that the systems described herein is merely exemplary implementations of the present disclosure.

What is claimed is:

1. A system comprising a controller including a processor and a memory, the memory including instructions such that the processor is configured to:
   receive a sensor data representing a perceived lane edge;
   receive map data including a lane edge;
   interpolate the sensor data and interpolate the map data to derive a predicted mean, $\mu_v$, for each of the sensor data and the map data, and a predicted covariance, $\Sigma_v$, for each of the sensor data and the map data, according to an interpolation scheme that follows $\mu_v = G_u(x_v)\mu_u$ and $\Sigma_v = P_u(x_v) + G_u(x_v)\Sigma_u G_u(x_v)^T$ where $\mu_u$ is a known mean from the interpolation of the sensor data from a preceding timestep and the map data from a preceding timestep, $\Sigma_u$ is a known covariance from the interpolation of the sensor data from a preceding timestep and the map data from preceding timestep, $G_u(x_v)$ is an interpolator gain, $P_u(x_v)$ is an interpolation uncertainty, and xv is an x-axis location of the perceived lane edge in a Cartesian coordinate system;
   fuse the interpolated sensor data and the interpolated map data; and
   generate predicted lane edge centers based on the fused interpolated sensor data and the interpolated map data.

2. The system as recited in claim 1, wherein the perceived lane edge represents a lane edge disposed on a roadway.

3. The system as recited in claim 2, wherein the lane edge included in the map data corresponds to the perceived lane edge.

4. The system as recited in claim 1, wherein the controller is further configured to generate the predicted lane edge centers using a Kalman filter.

5. The system as recited in claim 1, wherein the controller is further configured to transmit the predicted lane edge centers to an autonomous controller.

6. The system as recited in claim 5, wherein the autonomous controller is configured to operate a vehicle based on the predicted lane edge centers.

7. The system as recited in claim 6, wherein the controller is further configured to compare a calculated average perception innovation squared metric to a predetermined average perception innovation squared metric threshold, wherein the calculated average perception innovation squared metric is based on the predicted lane edge centers.

8. The system as recited in claim 7, wherein the autonomous controller is configured to operate the vehicle based on only the sensor data representing the perceived lane edge.

9. A method for determining a nominal path for a vehicle for autonomous driving, the method comprising:
receiving, via a controller, a sensor data representing perceived lane edges;
receiving map data, via a GPS, wherein the map data includes a lane edge;
converting the map data including the lane edge from a global coordinate system to an ego frame system relative to the vehicle;
interpolating the sensor data and interpolating the converted map data to derive a predicted mean, $\mu_v$, for each of the sensor data and the map data, and a predicted covariance, $\Sigma_v$, for each of the sensor data and the map data, according to an interpolation scheme that follows $\mu_v = G_u(x_v)\mu_u$ and $\Sigma_v = P_u(x_v) + G_u(x_v)\Sigma_u G_u(x_v)^T$ where $\mu_u$ is a known mean from the interpolation of the sensor data from a preceding timestep and the map data from a preceding timestep, $\Sigma_u$ is a known covariance from the interpolation of the sensor data from a preceding timestep and the map data from preceding timestep, $G_u(x_v)$ is an interpolator gain, $P_u(x_v)$ is an interpolation uncertainty, and xv is an x-axis location of the perceived lane edge in a Cartesian coordinate system;
fusing the interpolated sensor data and the interpolated map data to generate a fused set of data points;
comparing a distance the vehicle has traveled to a threshold, and updating the map data using the GPS when the distance is greater than or equal to the threshold;
predicting lane edges from the fused set of data points;
caching the predicted lane edges when the distance is less than the threshold;
calculating a difference between the predicted lane edges and the perceived lane edges;
commanding the vehicle to use only perceived lane edges for autonomous driving when the difference between the predicted lane edges and the perceived lane edges is greater than a threshold; and
calculating the nominal path of the vehicle using the predicted lane edges when the difference between the predicted lane edges and the perceived lane edges is less than the threshold.

10. The method as recited in claim 9, wherein the perceived lane edges represent lane edges disposed on a roadway.

11. The method as recited in claim 9, wherein the step of predicting lane edges from the fused set of data points includes using a Kalman filter.

12. The method as recited in claim 11, further comprising:
updating the Kalman filter with the fused set of data points when the difference between the predicted lane edges and the perceived lane edges is less than the threshold.

13. A system for determining a nominal path for a vehicle for autonomous driving, the system comprising a controller including a processor and a memory, the memory including instructions such that the processor is configured to:
receive, via the controller, a sensor data representing perceived lane edges;
receive map data, via a GPS, wherein the map data includes a lane edge;
convert the map data including the lane edge from a global coordinate system to an ego frame system relative to the vehicle;
interpolate the sensor data and interpolate the converted map data to derive a predicted mean, $\mu_v$, for each of the sensor data and the map data, and a predicted covariance, $\Sigma_v$, for each of the sensor data and the map data, according to an interpolation scheme that follows $\mu_v = G_u(x_v)\mu_u$ and $\Sigma_v = P_u(x_v) + G_u(x_v)\Sigma_u G_u(x_v)^T$ where $\mu_u$ is a known mean from the interpolation of the sensor data from a preceding timestep and the map data from a preceding timestep, $\Sigma_u$ is a known covariance from the interpolation of the sensor data from a preceding timestep and the map data from preceding timestep, $G_u(x_v)$ is an interpolator gain, $P_u(x_v)$ is an interpolation uncertainty, and xv is an x-axis location of the perceived lane edge in a Cartesian coordinate system;
fuse the interpolated sensor data and the interpolated map data to generate a fused set of data points;
compare a distance the vehicle has traveled to a threshold, and update the map data using the GPS when the distance is greater than or equal to the threshold;
predict lane edges from the fused set of data points;
cache the predicted lane edges when the distance is less than the threshold;
calculate a difference between the predicted lane edges and the perceived lane edges;
command the vehicle to use only perceived lane edges for autonomous driving when the difference between the predicted lane edges and the perceived lane edges is greater than a threshold; and
calculate the nominal path of the vehicle using the predicted lane edges when the difference between the predicted lane edges and the perceived lane edges is less than the threshold.

14. The system as recited in claim 13, wherein the step of predicting lane edges from the fused set of data points includes using a Kalman filter.

15. The method as recited in claim 14, wherein the processor is further configured to update the Kalman filter with the fused set of data points when the difference between the predicted lane edges and the perceived lane edges is less than the threshold.

* * * * *